Oct. 4, 1932.                G. TRAUTVETTER                1,880,591
                    PRESSED METAL VEHICLE BODY CONSTRUCTION
                             Filed Jan. 17, 1930
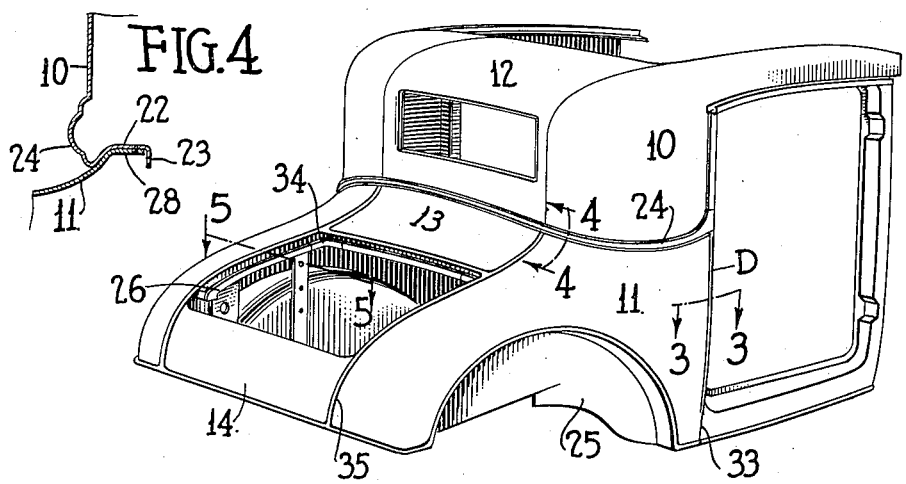
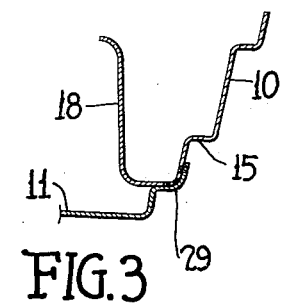
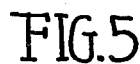
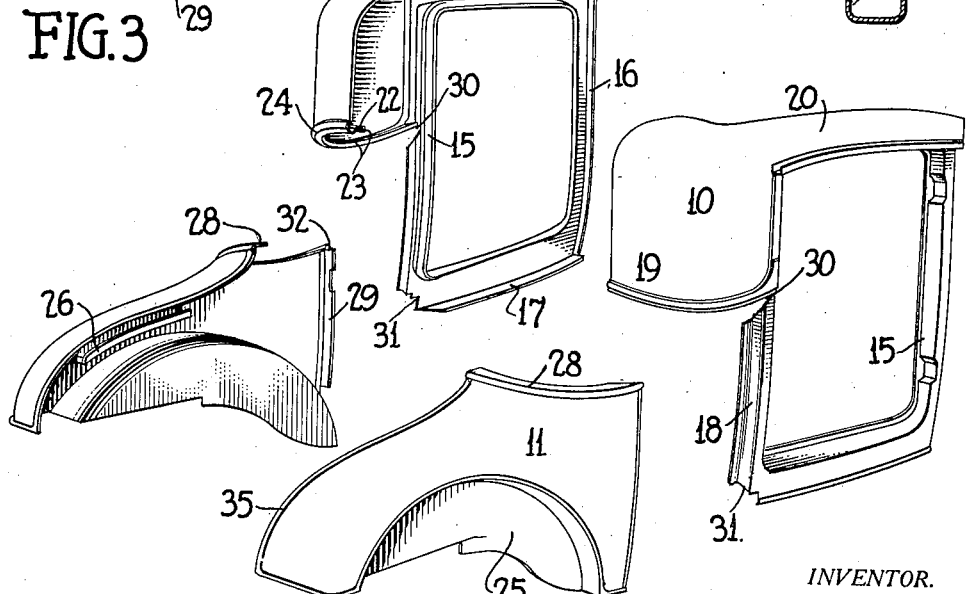
INVENTOR.
GEORGE TRAUTVETTER
BY
John P. Tarbox
ATTORNEY.

Patented Oct. 4, 1932

1,880,591

UNITED STATES PATENT OFFICE

GEORGE TRAUTVETTER OF PHILADELPHIA PENNSYLVANIA, ASSIGNOR TO EDWARD G. BUDD MANUFACTURING COMPANY, OF PHILADELPHIA, PENNSYLVANIA, A CORPORATION OF PENNSYLVANIA

PRESSED METAL VEHICLE BODY CONSTRUCTION

Application filed January 17, 1930. Serial No. 421,373.

The invention relates to vehicle bodies and more particularly to vehicle body parts made of pressed metal.

It is the object of my invention generally to simplify the construction of such bodies, particularly the side wall structures of such bodies, to render the final assembly easier and to produce a body which is light in weight and at the same time strong and durable. It is a further object of my invention to divide the side wall of a coupé type of body into units which are relatively easy to form and relatively easy of final assembly, particularly in bodies of the type in which the side walls are built up of large light gauge sheet metal stampings.

I attain the objects of my invention generally by making the side wall of the body in two main stampings, one extending completely around a doorway opening and framing said opening and above the belt extended rearwardly around the bend or at least a portion of the bend at the rear quarter, and the other extending from the bottom of the body to the deck opening and formed in the margin of the opening with an integral drip channel, and from the rear of the body to the rear edge of the door opening, said panel stampings being provided at their meeting edges with conformations whereby they may be readily joined together in final assembly.

The drip channel for the deck opening is, according to my invention, made almost wholly out of the panel stampings surrounding said opening. As far as this feature of the invention is concerned, it will be obvious that it may find application in other relations than in connection with a coupé deck opening.

Other and further objects and advantages of the new improved construction will become apparent from the following detailed description when read in connection with the accompanying drawing, in which Fig. 1 is a perspective, as seen from the rear of a portion of a body assembly to which the invention has been applied.

Fig. 2 is an exploded perspective view of the right and left side panel stampings, the view being taken from a rear position similar to the position from which the view in Fig. 1 is taken.

Figs. 3, 4 and 5 are, respectively, detail sectional views taken on the correspondingly numbered lines of Fig. 1.

According to the invention, I have shown the two side walls as comprised of two main stampings 10 and 11, connected by rear transverse panel stampings 12, 13 and 14 and at the front by a suitable front unit (not shown) and at the top by a roof panel (not shown).

The novel side unit stamping 10 extends entirely around a doorway opening and is flanged inwardly at 15 around said opening to the depth equal substantially to the thickness of the door. Its strength is further enhanced by a flange 16 at the front, a flange 17 at the bottom, a flange 18 extending inwardly just rearwardly of the doorway opening below the belt line, and by a curved rearward extension 19 above the belt extending partially or entirely around the rear quarter. It is further curved inwardly at the top to form the side of the roof 20, and is provided with an angular edge flange 21 to receive the roof unit.

At the bottom of the rearward extension it is inwardly flanged at 22, the flange 22 having a downwardly extending edge flange 23. Beading, as 24, may be arranged to overhang the flanges 22.

By this construction the unitary stamping 10 is, because of its generally inwardly facing channel section, although it may be made of relatively light gauge metal, strong and self-sustaining and capable of being handled and shipped as a unit. Where desirable, for further strength, as in the post sections, inner reinforcement (not shown) may be provided.

The unitary stamping 11, extends from the rear door post D rearwardly to the rear of the body and includes the wheel housing 25. It extends from the bottom of the body to and around the deck quarter and inwardly to the deck opening. An important feature of this stamping is the formation in it at the deck opening of an integral drip channel 26, the inner edge of which is reinforced by bending the edge back upon itself, as at 27.

Along the top edge of the panel stamping 11, where it conforms to the lower edge of the rearward extension 19 of the panel stamping 10, it is formed with a horizontally extending edge flange 28 and at its front edge it is formed with the stepped edge flange 29 which terminates short of the bottom of the panel.

The panel stampings 10 and 11, with their inner reinforcements are readily joined together in final assembly by bringing together into nested relation the angular seats formed by the beaded flanged edge of the extension 19 and the corresponding angular seat formed by the body of the panel stamping 11 and its edge flange 28 and spot welding the flanges 22 and 28 together. At the same time the forward stepped edge flange 29 of the panel 11 is brought to nest with the angular seat formed by the body and flange 15 of the D-post portion of the stamping 10 and secured thereto by spot welding.

At the bottom and top the flange 18 is cut away as indicated at 30 and 31 and the front edge of the flange 28 is similarly cut away at 32 to permit this nesting relation. At the forward bottom portion of the stamping 11, the flange 29 is omitted and a flat portion of the panel overlaps the flat portion of the lower edge of the panel stamping 10 and is welded thereto along the line 33, the weld line being subsequently cleaned off by grinding or otherwise.

The portion of the drip channel 26 at the top of the deck opening is formed, like the side portions, integral with the panel stamping 13 adjacent said edge. In this manner substantially the entire drip channel, at sides and top, is formed integrally with the adjoining panels, thus greatly improving the appearance around the deck opening and avoiding a number of extra operations. At the corners the side and top channel portions are joined by welding in the corner pieces, as 34.

The panels 12, 13 and 14 may be joined to the side units by welding or otherwise, and to improve the appearance along the deck joints, the side panels 11 may be provided with the beading 35. The beading 24 is extended across the rear panels 12 to form a continuous beading from D-post to D-post.

If desired, the rear panels 12 and 13 may be made a unitary stamping, with the beading integrally formed therein.

What I claim is:

1. In a vehicle body construction having an opening in the top thereof, sheet metal panel stampings forming the sides and top and bottom edges of said opening, the sides and top edges of said panels being formed with integral edge drip channel sections, the adjacent ends of the drip channel sections of the respective stampings being joined by corner channel sections welded thereto to form a continuous channel extending around the sides and top of the opening.

2. In a vehicle body construction of the coupé type, a side wall comprising a unitary stamping extending around a doorway opening and flanged inwardly around the opening to frame the same, said stamping terminating in its lower portion immediately in rear of said opening in an inwardly extending vertical flange and being extended rearwardly of said opening in its upper portion to form the rear quarter, the lower edge of said extension being flanged inwardly to form with the vertical flange parts of final assembly joints with an adjacent unit.

3. In a vehicle body construction having a rear deck and an opening therein, a side wall comprising a forward unitary stamping extending around a doorway opening and flanged inwardly around said opening to frame the same, and having a rearward curved extension to form the rear quarter in its upper portion, the lower edge of said extension being flanged inwardly, and a rear deck side stamping extending from the bottom of the body to the deck opening and conforming in its upper forward portion to the lower edge of the rearward extension of the forward stamping and secured to said flange, its forward edge being extended forwardly to overlap said inwardly flanged portion at the rear of the doorway opening and secured thereto.

In testimony whereof I hereunto affix my signature.

GEORGE TRAUTVETTER.